United States Patent
Ben Yehuda et al.

(10) Patent No.: US 8,453,149 B2
(45) Date of Patent: May 28, 2013

(54) EFFICIENT MULTI-CORE PROCESSING OF EVENTS

(75) Inventors: Shmuel Ben Yehuda, Haifa (IL); Abel Gordon, Haifa (IL); Orit (Luba) Wasserman, Mitzpe Aviv (IL); Ben-Ami Yassour, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 12/691,262

(22) Filed: Jan. 21, 2010

(65) Prior Publication Data

US 2011/0179253 A1 Jul. 21, 2011

(51) Int. Cl.
*G06F 9/46* (2006.01)
*G06F 9/455* (2006.01)

(52) U.S. Cl.
USPC ............... 718/102; 718/1; 718/108; 719/318

(58) Field of Classification Search
None
See application file for complete search history.

(56) References Cited

U.S. PATENT DOCUMENTS

| | | | | |
|---|---|---|---|---|
| 6,006,282 A * | 12/1999 | DeLeeuw et al. | ................. | 710/5 |
| 6,857,017 B1 * | 2/2005 | Faour et al. | ................... | 709/224 |
| 2003/0037178 A1 * | 2/2003 | Vessey et al. | ................. | 709/319 |
| 2006/0005188 A1 * | 1/2006 | Vega et al. | ......................... | 718/1 |
| 2007/0067775 A1 * | 3/2007 | Shultz et al. | .................. | 718/102 |
| 2008/0263513 A1 * | 10/2008 | Neumann et al. | ............. | 717/105 |
| 2009/0100424 A1 * | 4/2009 | Otte et al. | ........................ | 718/1 |

FOREIGN PATENT DOCUMENTS

WO 2009134217 A1 11/2009

OTHER PUBLICATIONS

Ada Gavrilovska, "High-Performance Hypervisor Architectures:Virtualization in HPC Systems", HPCVirt '07 Mar. 20, 2007, Lisbon, Portugal.

* cited by examiner

*Primary Examiner* — Camquy Truong
(74) *Attorney, Agent, or Firm* — F. Jason Far-hadian; Century IP Group

(57) ABSTRACT

A computer implemented method for handling events in a multi-core processing environment is provided. The method comprises handling an event by a second application running on a second core, in response to determining that the event is initiated by a first application running on a first core; and running a third application on the first core, while the first application is waiting for the event to be handled by the second application.

10 Claims, 5 Drawing Sheets

EFFICIENT MULTI-CORE PROCESSING OF EVENTS

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to multi-core processing and, more particularly, to a system and method for efficiently handling events in a multi-core processing environment.

BACKGROUND

In multi-core processing environments, virtualized services may be provided where a virtual machine running on one core is hosted by a hypervisor that is running on a different core. In such a situation, the operation of the virtual machine is typically interrupted if a certain event requires interaction with the hypervisor (e.g., when the hypervisor attempts to inject an interrupt into the operation of the virtual machine, or when the virtual machine performs a privileged instruction which the hypervisor needs to emulate).

The above-noted interruption prevents the hypervisor from taking advantage of idle processing time splits across different cores, slows down the operation of the virtual machine, causes additional context switches between the hypervisor and the virtual machine and creates a significant latency from the time an event is created until it is injected to the virtual machine.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for handling events in a multi-core processing environment is provided. The method comprises handling an event by a second application running on a second core, in response to determining that the event is initiated by a first application running on a first core; and running a third application on the first core, while the first application is waiting for the event to be handled by the second application.

In one embodiment, a computer implemented method for handling events in a multi-core processing environment is provided. The method comprises initiating an event by a host on a first core; and placing the host initiated event on a queue, in response to determining that the host initiated event is to be handled by a guest running on a second core, wherein the second core removes the host initiated event from the queue and triggers an event handler for the guest to handle the host initiated event.

In another embodiment, a computer implemented method for handling events in a multi-core processing environment is provided. The method comprises initiating an event by a guest on a first core; and placing the guest initiated event on a queue, in response to determining that the guest initiated event is to be handled asynchronously by a host running on a second core; and awakening a second core to handle the event by a host running on the second core without placing the guest initiated event on the queue while the guest event is suspended until the guest initiated event is handled by the host, in response to determining that the guest initiated event is to be handled synchronously by the host running on the second core, wherein the second core removes the guest initiated event from the queue and triggers an event handler for the host to handle the host initiated event.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
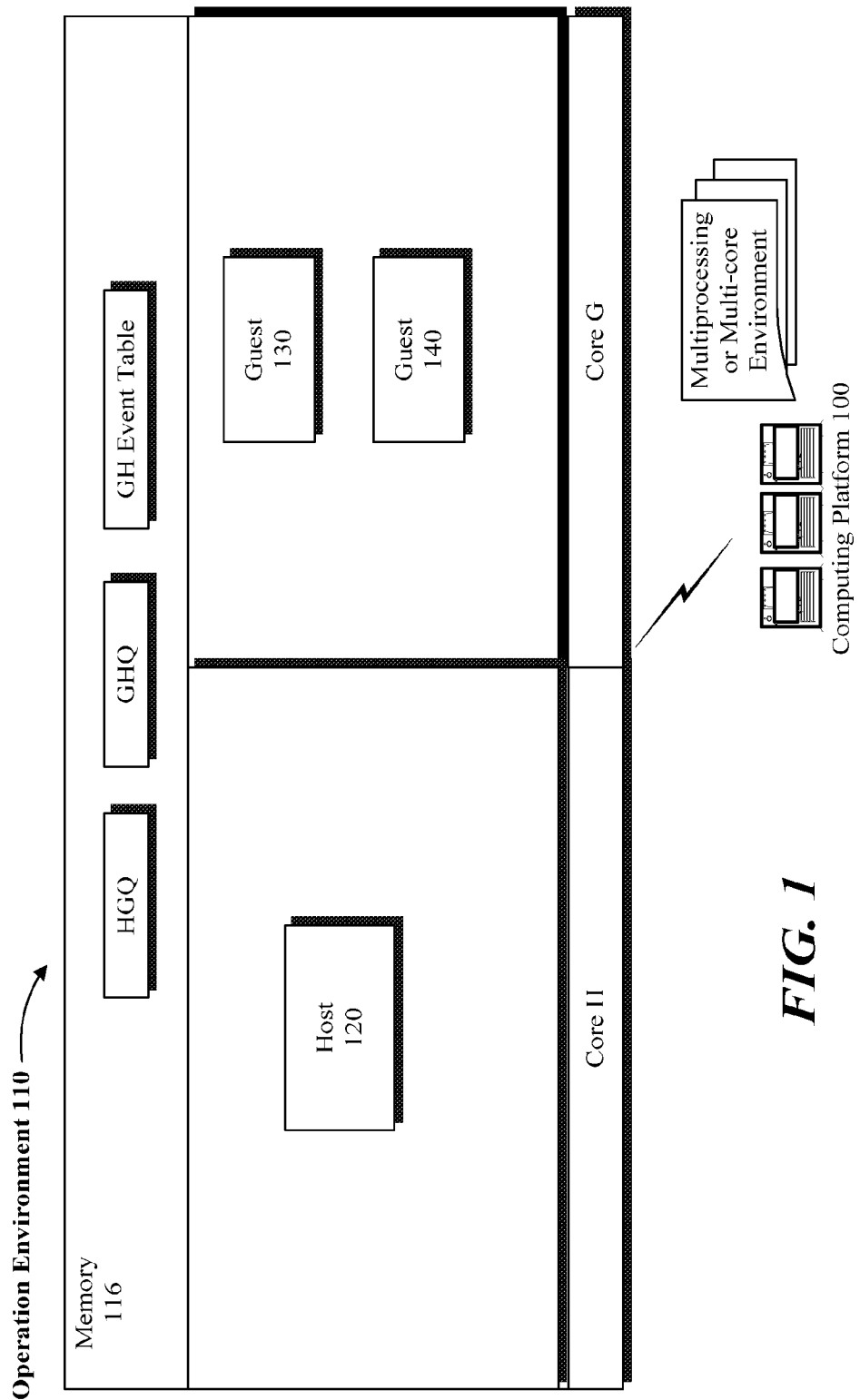
FIG. 1 illustrates an exemplary operation environment in accordance with one or more embodiments.

Referring to FIG. 1, a multi-core environment may be supported over a computing platform 100 to permit concurrent processing and execution of program code for one or more software applications. For example, a host application 120 (e.g., a hypervisor) may be concurrently executed with a guest application 130 (e.g., a virtual machine) on computing platform 100 over one or more cores. The term core as used here may refer to a microcontroller, a microprocessor or other processing mechanism, whether hardware or software or a combination thereof, that may be utilized to fetch and execute computing instructions.

In an exemplary multi-core environment, several processing cores (e.g., core H and core G) may be provided so that, for example, a host 120 is executed over a first core H and guests 130 or 140 are executed on a second core G. Depending on the computing architecture and platform, the processing cores may be implemented in form of processing threads, microcontrollers or other forms of physical or virtual processing systems, without limitation. It is also possible that host 120 and one or more guests 130, 140 may be executed on the same core (e.g., core H), depending on system configuration and availability of resources.

In an exemplary operation environment 110, a virtualization scheme or protocol may be utilized to provide a means of communication between host 120, guest 130 and the underlying computing platform 100 by maintaining and updating information (i.e., state data) about the execution state of host 120 or guest 130. Depending on implementation, the state information for host 120 may be stored in one area of memory, and the state information for guest 130 may be stored in another memory area (not shown). If the respective state information for host 120 or guest 130 changes, it is determined whether such change is due to an event or operation initiated either by host 120 or guest 130.

Figure 2:
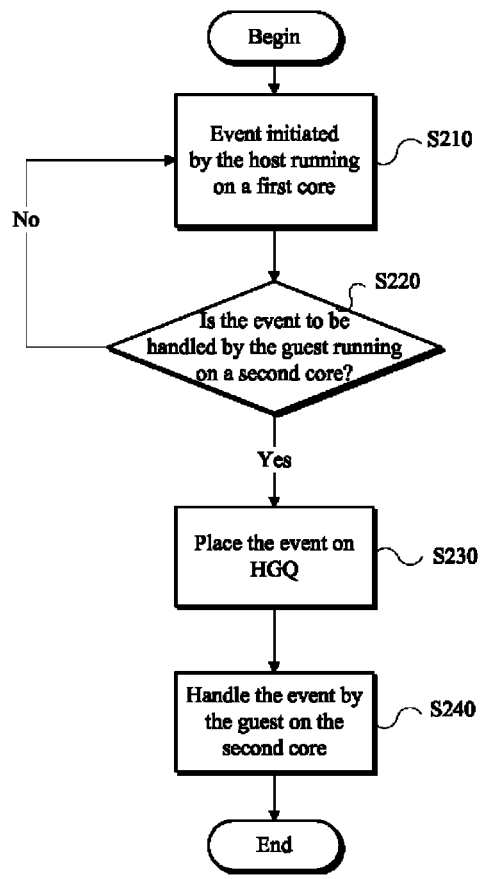
FIG. 2 is a flow diagram of a method for efficient handling of events in a multi-core processing environment, in accordance with one embodiment.

Referring to FIG. 2, in one example, an event may be initiated by host 120 running on core H (S210). If the event is to be handled by guest 130 running on core G (S220), the host event is placed in a data structure, hereafter referred to as the host to guest queue or the HGQ (S230) without waiting for guest 130 to release core G. That is, the host instead of taking control of core G for the purpose of injecting the event to the guest, simply places the event on the HGQ. This scheme also helps avoid interrupting the operation of guest 130 until the host event is handled by guest 130. In certain embodiments, events initiated by host hardware (e.g., computing platform 100) may be also added to the HGQ, optionally, without the intervention of the software host 120.

The events placed on the HGQ are handled by core G on which guest 130 is running (S240). That is, once the event is added to the HGQ, the designated core (e.g., core G) is responsible for removing the event from the HGQ and passing it to guest 130 for the handling. In other words, core G removes the event from HGQ and triggers an event handler for guest 130. The event handler handles the event triggered by core G, as provided in further detail below.

The HGQ may be implemented in the form of a first in first out (FIFO) queue, for example, or any other type of suitable data structure. The events stored in the HGQ may be handled based on priority or other logical order. For example, the order in which the events are handled may be defined such that, where possible, the handling of the event by core G does not result in interrupting the execution of guest 130. For example, an event initiated by host 120 may be handled by core G after guest 130 has completed execution or has reached an idle state, or when guest 130 is in a state that the interruption of the execution of guest 130 is deemed permissible.

Figure 3:
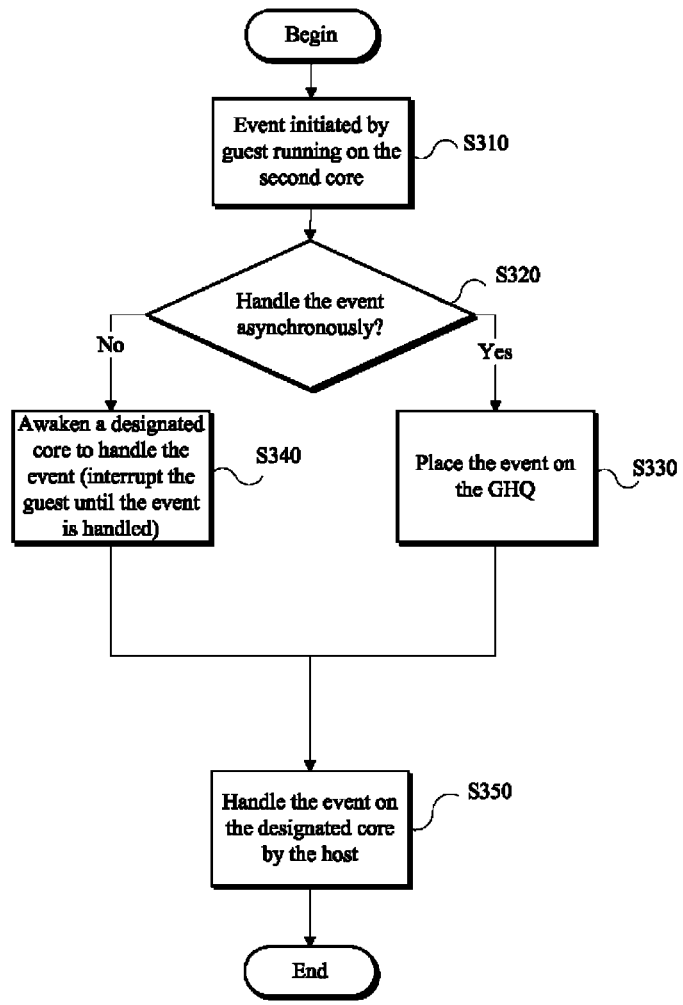
FIG. 3 is a block diagram of another method for efficient handling of events in a multi-core processing environment, in accordance with one embodiment.

Referring to FIG. 3, in another example, an event may be initiated by guest 130 running on core G (S310). In one embodiment, it may be determined whether the event can be handled by core H without interrupting the operation of guest 130 running on core G. That is, it is determined whether the event can be handled asynchronously (S320). This determination may be made by referring to records stored in a data structure, hereafter referred to as the guest host (GH) event table. Depending on implementation, said data structure may be implemented in the form of a data table or other suitable data structure format that provides a means to map an event to an identifier, for example, that helps distinguish between types of events that may be handled asynchronously.

A certain event may be handled by, for example, core H on which host 120 operates, or other designated core in a multi-core environment. In some embodiments, the GH event table may indicate one or more cores as the designated cores for handling a particular event. Depending on implementation, if more than one core is designated, the task of handling the particular event is assigned to the core that has less processing overhead, or in accordance with other factors or criteria that may be used to effectuate the proper core selection for optimum efficiency.

If it is determined that the event may be handled asynchronously, then the guest initiated event is placed in a data structure, hereafter referred to as the guest host queue or the GHQ (S330). When an event, initiated by guest 130 is handled asynchronously, guest 130 running on core G continues without any interruption. The GHQ may be implemented in form of a FIFO queue, for example, or any other type of suitable data structure. The events stored in the GHQ may be handled based on priority or other defined order by core H or other designated core, at an appropriate time.

Depending on implementation and the type of event placed on the GHQ, execution of host 120 may or may not be interrupted. Whether the execution of host 120 is interrupted depends on the type of event, and the instructions included in the GH event table for the type of event placed on the GHQ. Thus, for example, if the information (e.g., indicators, identifiers, flags, etc.) included in the GH event table provide that the added event to the GHQ is not to be handled asynchronously, then core H or other core designated for handling that event is awakened to handle that event and guest 130 running in core G is interrupted until the guest initiated event is handled by host 120 on a designated core (e.g., core H or core G) (S340). As such, a designated core (e.g., core H) is utilized by host 120 to handle the guest initiated event (S350).

Once an event placed on the HGQ or the GHQ is handled, that event is removed (e.g., dequeued) from the respective data structure or queue. In addition, two mechanisms may be used by host 120 to handle a guest initiated event. In a first implementation, host 120 pops an event from the GHQ and handles the event when appropriate (e.g., during an idle period). In a second implementation, a core designated for handling the event triggers host 120 and calls the corresponding event handler for host 120. The event handler then interrupts host 120 from any task host 120 was performing, until the guest initiated event is handled.

The information in the GH event table may be used to determine whether the initiated operations or events are to be handled asynchronously or synchronously. Since certain events may not be suited for being queued for later handling, such events are to be performed in a synchronous manner (e.g., the operation of guest 130 is to be interrupted until the guest 130 initiated event is handled by the host, in accordance with one or more embodiments.

Optionally, a proper indication (e.g., an external interrupt) may be submitted to core H on which the host is operating (or to another core depending on implementation) to handle the guest initiated event. Core G may stop executing guest 130 while the guest initiated event is handled by core H. In one embodiment, advantageously, core G may be assigned to perform additional tasks or may be used to execute another guest (e.g., guest 140) while core H or another designated core (e.g., core G) is handling the initiated event by guest 130.

Depending implementation, the GH event table, the HGQ and the GHQ may be implemented in form of data structures stored in memory 116. Memory 116 may be any type of physical or virtual memory configured for storing data either in a volatile or non-volatile manner. In the following, additional exemplary scenarios using more specific event types or operations are provided by way of example. It is noteworthy that such exemplary scenarios should not be construed as limiting the scope of the claimed subject matter to the particular details and examples discussed herein.

Guest Initiated Events

In one example, host 120 may configure the GH event table to synchronously handle a programmed input/output (PIO) write event initiated by guest 130. Accordingly, the corresponding GH event table entry designates core H to handle the PIO write by interrupting the execution of other tasks when a PIO write event is placed on the GHQ as provided in further detail below.

If guest 130, running on core G, initiates a PIO write, core G refers to the corresponding entry in the GH event table to determine how a PIO write is to be handled. The entry in GH event table may indicate that the PIO write event is to be handled asynchronously by core G (i.e., that it may be place on the GHQ). The GH event table entry may also indicate that the event is to be expeditiously handled by core H, for example, in that any running tasks or programs on core H are to be interrupted until the PIO write event is handled.

As such, in this exemplary scenario, core G places the PIO write event on the GHQ and submits a request for handling the PIO write event to core H as an external interrupt, for example. Upon receiving the interrupt, host 120 is triggered and executed on core H. Host 120 causes core H to handle the PIO write event pushed on the GHQ by core G. While core H is handling the PIO write event, guest 130 may continue to run on core G.

In another example, host 120 may configures the GH event table to asynchronously handle a hypercall (HC1) initiated by guest 130. The host 120 may configure the corresponding GH event table entry to indicate that core H is to handle the HC1 event pushed on the GHQ and interrupt any task being performed on core H, until the HC1 event is handled, as provided in more detail below.

If a guest 130, running on core G, executes HC1, core G refers to the corresponding GH event table entry to determine how HC1 should be handled. Based on the GH event table entry, core G may determine that the HC1 event is to be handled asynchronously by core H, and in addition, any running task on core H is to be interrupted until the HC1 event is handled. As such, HC1 event is pushed onto the GHQ by guest 130, and host 120 is triggered and executed on core H to handle the HC1 event placed on the GHQ. Host 120 may remove the HC1 event from GHQ and handle the event on core H, while guest 130 continues to execute on core G without interruption.

Host Initiated Events

In one example, host 120 may be running on core H. Host 120 may inject an external interrupt to guest 130 running on core G to handle an event. To accomplish the above, host 120, running on core H, may place the external interrupt event on the HGQ. When core G determines that a new event is added to the HGQ by guest 130, core G removes the corresponding event from the HGQ and provides the event to guest 130 for handling. Depending on implementation, a guest event handler routine for guest 130 may be called to handle the respective event.

In another example, host 120 running on core H responds to a request for asynchronously handling a hypercall event. Host 120, running on core H, places the hypercall event on the HGQ. When core G determines that the hypercall event is placed on the HGQ for guest 130, core G removes the corresponding hyper call event from the HGQ and provides the hypercall event to guest 130 for handling. As a result, a hypercall response handler routine is called by guest 130 to handle the hypercall event, for example, asynchronously.

In yet another example, host 120 may configure a hardware device (e.g. a network card with virtualization capabilities) to transfer events corresponding to guest 130 directly to the HGQ for that guest. The network card, upon reception of a new packet for guest 130, adds a corresponding event to the HGQ for guest 130. In one embodiment, when core G determines that a new event is added to the HGQ of guest 130, core G removes the respective event from the HGQ and provides it to guest 130 for handling. As a result, the event handler routine for guest 130 is called to handle the event.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
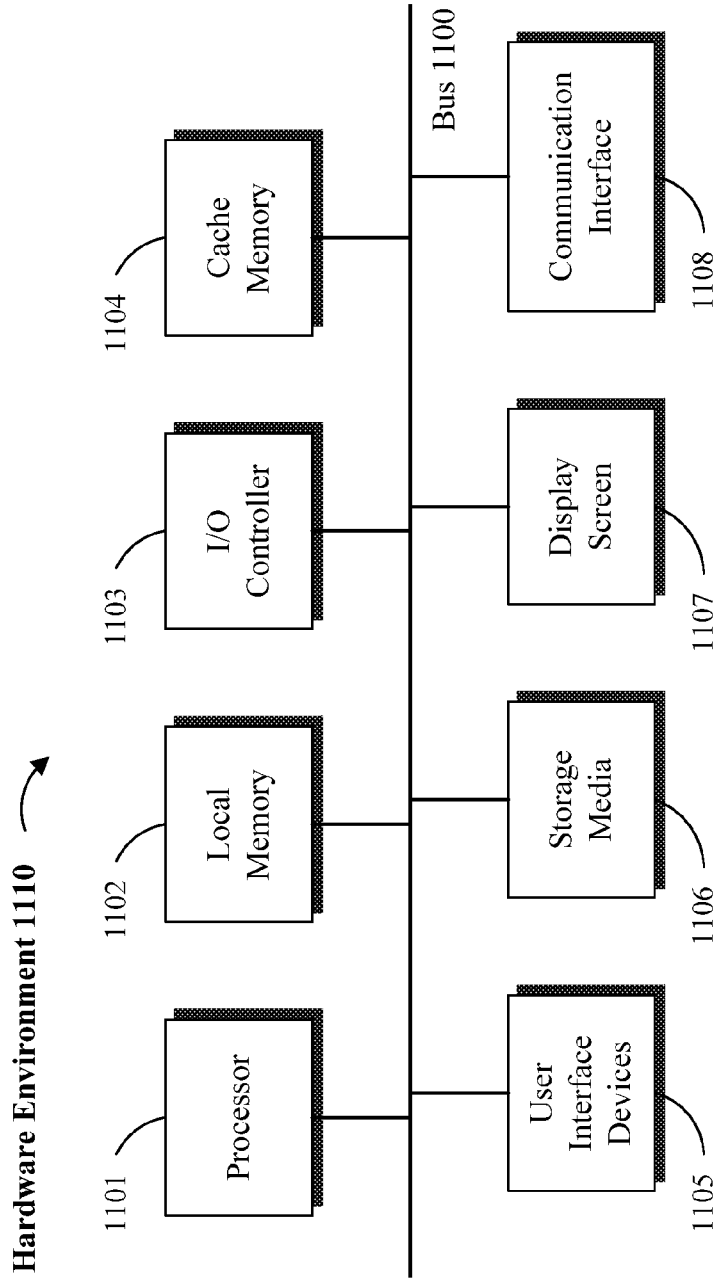
FIGS. 4A and 4B are block diagrams of hardware and software environments in which the disclosed systems and methods may operate, in accordance with one or more embodiments.
Figure 4B:
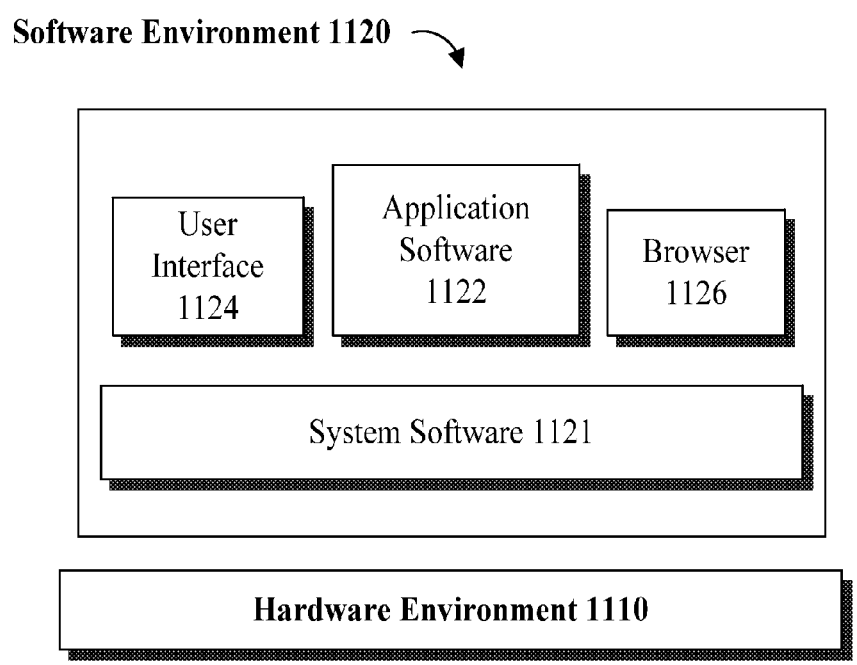

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable storage medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer implemented method for handling events in a multi-core processing environment, the method comprising:

initiating a first event by a guest running on a first core in a multi-core processing environment;

placing the first event on a queue, in response to determining that the first event is to be handled asynchronously by a host running on a second core;

handling the first event by the host running on the second core, in response to determining that the first event is initiated by the guest running on the first core;

initiating a second event by the guest on the first core, while the guest is waiting for the first event to be handled by the host on the second core, wherein the second core removes the first event from the queue and triggers an event handler for the host to handle the first event; and awakening the second core to handle the first event by the host running on the second core without placing the first event on the queue, in response to determining that the first event is to be handled synchronously by the host running on the second core, wherein the guest on the first core is suspended while the first event is being handled by the host running on the second core, and wherein the guest running on the first core is a virtual machine supported by the host running on the second core, such that the host is configured to provide the operating environment for the execution of the host.

2. The method of claim 1 comprising:

initiating an event by the host on the first core; and placing the host initiated event on a queue, in response to determining that the host initiated event is to be handled by a guest running on the second core, wherein the second core removes the host initiated event from the queue and triggers an event handler for the guest to handle the host initiated event.

3. The method of claim 2 wherein the guest handles the host initiated event when the guest is in an idle mode.

4. The method of claim 2 wherein the host continues to run on the first core while the host initiated event is placed on the queue.

5. The method of claim 1 wherein the first event is categorized as either an event that is to be handled asynchronously or synchronously.

6. The method of claim 1 wherein a data structure is utilized to associate a first event with a synchronous or asynchronous category such that the first core may determine whether the first event is to be placed on the queue.

7. A system for handling events in a multi-core processing environment, the system comprising:
- one or more processors for executing instructions loaded in memory of a computing machine;
- a logic unit for initiating a first event by a guest running on a first core;
- a logic unit for placing the first event on a queue, in response to determining that the guest initiated event is to be handled asynchronously by a host running on a second core;
- a logic unit for handling the first event by the host running on the second core, in response to determining that the first event is initiated by the guest running on the first core;
- a logic unit for initiating a second event by the guest on the first core, while the guest is waiting for the first event to be handled by the host on the second core, wherein the second core removes the first event from the queue and triggers an event handler for the host to handle the first event; and
- a logic unit for awakening the second core to handle the first event by the host running on the second core without placing the first event on the queue, in response to determining that the first event is to be handled synchronously by the host running on the second core, wherein the guest on the first core is suspended while the first event is being handled by the host running on the second core, and
- wherein the guest running on the first core is a virtual machine supported by the host running on the second core, such that the host is configured to provide the operating environment for the execution of the host.

8. The system of claim 7 wherein the first event is categorized as either an event that is to be handled asynchronously or synchronously.

9. The system of claim 7 wherein a data structure is utilized to associate the first event with a synchronous or asynchronous category such that the first core may determine whether the first event is to be placed on the queue.

10. A computer program product comprising a non-transitory data storage medium having a computer readable program, wherein the computer readable program when executed on a computer causes the computer to:
- initiate a first event by a guest running on a first core;
- place the first event on a queue, in response to determining that the first event is to be handled asynchronously by a host running on a second core;
- handle the first event by the host running on the second core, in response to determining that the first event is initiated by the guest running on the first core; and
- initiate a second event by the guest on the first core, while the guest is waiting for the first event to be handled by the host on the second core, wherein the second core removes the first event from the queue and triggers an event handler for the host to handle the first event; and
- awaken the second core to handle the event by the host running on the second core without placing the first event on the queue, in response to determining that the first event is to be handled synchronously by the host running on the second core, wherein the guest on the first core is suspended while the first event is being handled by the host running on the second core, and
- wherein the guest running on the first core is a virtual machine supported by the host running on the second core, such that the host is configured to provide the operating environment for the execution of the host.

* * * * *